US012634602B2

(12) United States Patent
Horchner

(10) Patent No.: US 12,634,602 B2
(45) Date of Patent: May 19, 2026

(54) IMAGE SENSING SYSTEM AND METHOD FOR IMAGING

(71) Applicant: VENTANA MEDICAL SYSTEMS, INC., Tucson, AZ (US)

(72) Inventor: Uwe Horchner, Woodside, CA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 0 days.

(21) Appl. No.: 18/888,239

(22) Filed: Sep. 18, 2024

(65) Prior Publication Data

US 2025/0024174 A1 Jan. 16, 2025

Related U.S. Application Data

(63) Continuation of application No. PCT/US2023/016047, filed on Mar. 23, 2023.
(Continued)

(51) Int. Cl.
*H04N 25/704* (2023.01)
*G02B 3/10* (2006.01)
(Continued)

(52) U.S. Cl.
CPC ............. *H04N 25/704* (2023.01); *G02B 3/10* (2013.01); *G02B 7/38* (2013.01); *H04N 25/134* (2023.01);
(Continued)

(58) Field of Classification Search
CPC .. H04N 25/134; H04N 25/701; H04N 25/702; H04N 25/704; H04N 25/77;
(Continued)

(56) References Cited

U.S. PATENT DOCUMENTS

2005/0099619 A1* 5/2005 McClurg ............ G06V 40/1324
250/556
2010/0188532 A1* 7/2010 Kusaka ............... H10F 39/8057
348/240.99
(Continued)

FOREIGN PATENT DOCUMENTS

GB 2505691 A 3/2014
JP 2002341250 A 11/2002
(Continued)

OTHER PUBLICATIONS

Japanese Patent No. 2024560301, "Notice of Allowance", Aug. 29, 2025, 3 pages.
(Continued)

*Primary Examiner* — Lin Ye
*Assistant Examiner* — Chriss S Yoder, III
(74) *Attorney, Agent, or Firm* — Kilpatrick Townsend & Stockton LLP

(57) ABSTRACT

Embodiments described herein pertain to systems and methods for imaging. An imaging system may include a castellated optical element, a CMOS image sensor, and color filtering elements. The CMOS image sensor may include focus areas, a line-scan area, a 2D imaging area, and look-ahead gaps. The imaging system may be configured scan and capture bi-directionally, forward-focused brightfield and fluorescence images of one or more slides comprising at least one biological material.

29 Claims, 6 Drawing Sheets

Related U.S. Application Data

(60) Provisional application No. 63/329,673, filed on Apr. 11, 2022.

(51) Int. Cl.

| | |
|---|---|
| *G02B 7/38* | (2021.01) |
| *H04N 25/13* | (2023.01) |
| *H04N 25/701* | (2023.01) |
| *H04N 25/702* | (2023.01) |
| *H04N 25/77* | (2023.01) |

(52) U.S. Cl.
CPC ......... *H04N 25/701* (2023.01); *H04N 25/702* (2023.01); *H04N 25/77* (2023.01)

(58) Field of Classification Search
CPC .......... G02B 3/0087; G02B 3/08; G02B 3/10; G02B 7/38; G02B 21/244; G02B 21/245
See application file for complete search history.

(56) References Cited

U.S. PATENT DOCUMENTS

| | | | | |
|---|---|---|---|---|
| 2014/0071438 A1* | 3/2014 | Gouch | .................. | G01J 1/0407 |
| | | | | 356/123 |
| 2018/0188517 A1* | 7/2018 | Zou | ........................ | G02B 21/18 |
| 2021/0152743 A1* | 5/2021 | Mine | ..................... | H04N 25/57 |

FOREIGN PATENT DOCUMENTS

| | | | |
|---|---|---|---|
| JP | 2005168040 A | 6/2005 | |
| JP | 2014240888 A | 12/2014 | |
| JP | 2018532132 A | 11/2018 | |
| JP | 2021193459 A | 12/2021 | |

OTHER PUBLICATIONS

PCT/US2023/016047 , "International Search Report and Written Opinion", Jul. 25, 2023, 9 pages.

* cited by examiner

IMAGE SENSING SYSTEM AND METHOD FOR IMAGING

CROSS-REFERENCE TO RELATED APPLICATIONS

This application is a continuation of International Application No. PCT/US2023/016047, filed on Mar. 23, 2023, which claims priority to U.S. Provisional Patent Application No. 63/329,673, filed on Apr. 11, 2022. Each of which are hereby incorporated by reference in their entireties for all purposes.

FIELD

The present invention generally relates to a system and method for imaging. Particularly, the present invention relates to a system and method for imaging biological materials.

BACKGROUND

Digital pathology scanners generate images of slides of prepared biological materials, which pathologists can use to inform a diagnosis and guide therapeutic decision-making. Some digital pathology scanners include multiple line-scan sensors. However, these digital pathology scanners suffer from drawbacks. For example, because line-scan sensors are typically designed for and are used in industrial applications, there are a limited number of manufacturers with widely diverging sensor designs. Additionally, since many line-scan sensor designs are application driven, it is unlikely that line-scan sensors sourced from different manufacturers will be optically and electronically interchangeable with each other. Furthermore, due to the limited number of manufacturers of line-scan sensors, there is a risk that a manufacturer providing a particular line-scan sensor may not provide that particular line-scan sensor for the planned life of the digital pathology scanner. As another example, digital pathology scanners are subject to registration errors due to the physical separation between multiple line-scan sensors. As yet another example, digital pathology scanners are not configured to perform both brightfield imaging and fluorescence imaging. The present invention overcomes these drawbacks.

BRIEF SUMMARY

Embodiments described herein pertain to systems and methods for imaging. According to some embodiments, an imaging system may include a castellated optical element, a CMOS image sensor having pixels arranged in pixel columns. The pixel columns can include a first set of columns that may include focus areas, a second set of columns that may include a line-scan area, and a third set of columns that may include a two-dimensional imaging area. The imaging system may also include a plurality of color filtering members that are disposed over pixels of the two-dimensional imaging area and may include one or more first color filtering elements, one or more second color filtering elements, and one or more third color filtering elements.

The castellated optical element may be formed of sections such that each section may have a different refractive index. The castellated optical element may comprise high-density flint glass.

One section of the castellated optical element may be disposed over a portion of the first set of columns such that light may converge on a first focal plane separated by a first distance from an object plane and another section of the objective may be disposed over another portion of the first set of columns such that light may converge on a second focal plane separated by a second distance, less than the first distance, from the object plane.

A first focus area converged on the first focal plane and a second focus area converged on the second focal plane.

A third section of the castellated optical element may be disposed over a third portion of the first set of columns such that light may converge on a third focal plane separated by a third distance, less than the first and second distances, from the object plane.

A first focus area may receive light converged on the first focal plane, a second focus area may receive light converged on the second focal plane, and a third focus area may receive light converged on the third focal plane.

Each of the color filtering elements may include one or more materials dyed with at least organic dye. In some embodiments, the color filtering elements may include at least one dielectric stack. In some embodiments, the color filtering elements may be disposed over pixels of the line-scan area. In some embodiments, the color filtering elements may be disposed over pixels of the two-dimensional imaging area.

The color filtering elements may filter light into a first red wavelength band and second red wavelength band, filter light into a first green wavelength band and second green wavelength band, and filter light into a first blue wavelength band and second blue wavelength band.

The line-scan area may be disposed between a first focus area and a second focus area and the two-dimensional imaging area may be disposed between the second focus area and a third focus area. In some embodiments, the two-dimensional imaging area may capture brightfield images. In some embodiments, the two-dimensional imaging area may capture fluorescence images. In some embodiments, the focus areas and the line scan area may perform bi-directional forward-looking dynamic focusing on a tissue sample.

A method for imaging may include acquiring focusing signals of a tissue sample with focus areas of a CMOS image sensor such that a first focus area may receive light, that has passed through a castellated optical element, from a first focal plane, a second focus area may also receive light, that has passed through the castellated optical element, from a second focal plane, and a third focus area may also receive light, that has passed through the castellated optical element, from a third focal plane, scanning the tissue sample with a line-scanning area of the CMOS image sensor, and capturing an image of the tissue sample with a two-dimensional imaging area of the CMOS image sensor.

The castellated optical element may be formed of sections such that each section may have a different refractive index. In some embodiments, the castellated optical element may comprise high-density flint glass.

The first focal plane may be located at a first distance from an object plane, the second focal plane may be located at a second distance from the object plane, and the third focal plane may be located at a third distance from the object plane. In some embodiments, the first distance may be greater than the second distance and the second distance may be greater than the third distance.

Color filtering elements may be disposed over pixels of the two-dimensional imaging area. Color filtering elements may comprise one or more materials dyed with at least organic dye. Color filtering elements may comprise at least one dielectric stack. The color filtering elements may filter light into a first red wavelength band and second red wavelength band, filter light into a first green wavelength band and second green wavelength band and may filter light into a first blue wavelength band and second blue wavelength band.

The line-scan area may be disposed between a first focus area and a second focus area and the two-dimensional imaging area may be disposed between the second focus area and a third focus area. Capturing the image may include capturing brightfield images. Capturing the image may include capturing fluorescence images. The method may include performing bi-directional forward-looking dynamic focusing on the tissue sample based on the acquired focusing signals and the scanned tissue sample.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTIONS OF THE DRAWINGS

Aspects and features of the various embodiments will be more apparent by describing examples with reference to the accompanying drawings, in which.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Digital pathology typically involves the acquisition, management, and interpretation of data relating to pathology. Some aspects of digital pathology involve capturing digital images, which pathologists can use to inform a diagnosis and guide therapeutic decision-making. The digital images may be of various objects, and, in some examples, the digital images may be of one or more slides comprising one or more biological materials. Biological materials may include materials of human origin, materials of animal origin, and/or microbes. Biological materials may also include muscle tissue, organ tissue, blood, blood derivatives, urine, stool, saliva, cells, cultures, and/or other materials. In some examples, biological materials may be obtained from living and dead organisms. In some examples, biological materials may be obtained from biobanks, biorepositories, and/or other entities that acquire and store biological materials. In some examples, digital pathology scanners may perform dynamic focusing using a line-scan sensor and a focusing sensor while capturing the digital images.

Figure 1:
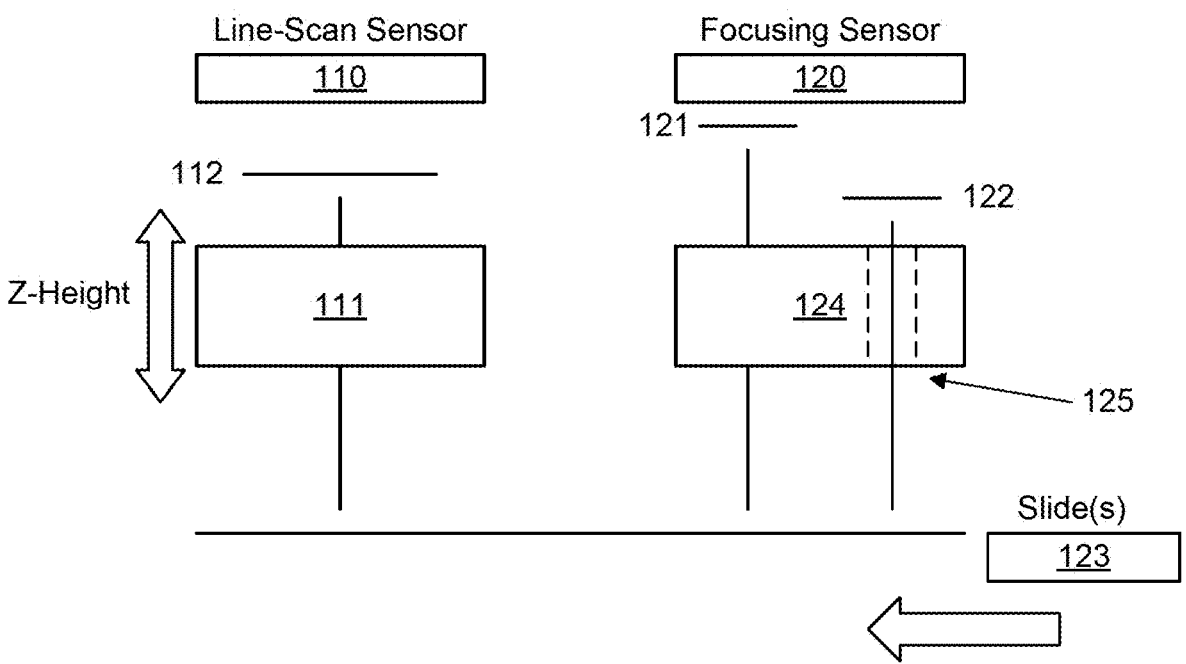
FIG. 1 shows an example of a digital pathology scanner.

As shown in FIG. 1, one example of a digital pathology scanner 100 includes a line-scan sensor 110, an image capturing objective 111, a line-scan focusing sensor 120, and a castellated optical element 124. Signals from the line-scan focusing sensor 120 are used to determine a focus position for the line-scan sensor 110 based on images of one or more slides 123 captured through the castellated optical element 124. The line-scan sensor 110 is focused by adjusting the height (z-height) of the image capturing objective 111 in accordance with the determined focus position. The focus position is determined, using a contrast-based focusing method, from a contrast-based focus score determined for a far focus position 121 and a contrast-based focus score determined for a near focus position 122. The far focus position 121 and near focus position 122 are established by the castellated optical element 124. The castellated optical element 124 is provided with periodically spaced air though-holes 125, formed by removing material from portions of the castellated optical element 124, such that light passing through the air through-holes 125 converges at the near focus position 122 and light passing through the material of the castellated optical element 124 converges at the far focus position 121. A nominal focus position 112 for the line-scan sensor 110 is established by the image capturing objective 111 and is located at a position between the near focus position 121 and the far focus position 121. Based on the determined focus position, the height (z-height) of the image capturing objective 111 is adjusted within a predetermined range. Thus, as the one or more slides 123 passes in front of the line-scan focusing sensor 120, the focus position may be dynamically adjusted at a high frequency.

However, in such digital pathology scanners, a physical separation between the line-scan sensor and the line-scan focusing sensor can cause registration errors between portions of the one or more slides relied on to perform focusing and portions of the one or more slides relied on to capture images. Moreover, digital pathology scanners are not configured to perform both brightfield imaging and fluorescence imaging on the one or more slides. Additionally, because line-scan sensors are typically designed for and are used in industrial applications, there are a limited number of manufacturers with widely diverging sensor designs. Furthermore, since many line-scan sensor designs are application driven, it is unlikely that line-scan sensors sourced from different manufacturers will be optically and electronically interchangeable with each other. Moreover, due to the limited number of manufacturers of line-scan sensors, there is a risk that a manufacturer providing a particular line-scan sensor may not provide that particular line-scan sensor for the planned life of the digital pathology scanner.

To compensate for these limitations, a system and method for imaging one or more slides comprising one or more biological materials with a two-dimensional (2D) complementary metal oxide semiconductor (CMOS) image sensor configured to perform bi-directional forward-looking dynamic focusing is provided. CMOS image sensors provide a unique advantage over line-scan sensors in that 2D CMOS image sensors are typically available in a variety of different designs and are manufactured using standard semiconductor manufacturing techniques. By replacing the line-scan sensor and line-scan focusing sensor with a 2D CMOS image sensor, potential registration errors caused by incorporating multiple sensors are obviated and the potential for sourcing optically and electronically interchangeable sensors during the planned life of the digital pathology scanner is increased. Additionally, as discussed in more detail herein, a 2D CMOS image sensor can capture images of one or more slides comprising one or more biological materials using brightfield and fluoresce imaging techniques.

Figure 2:
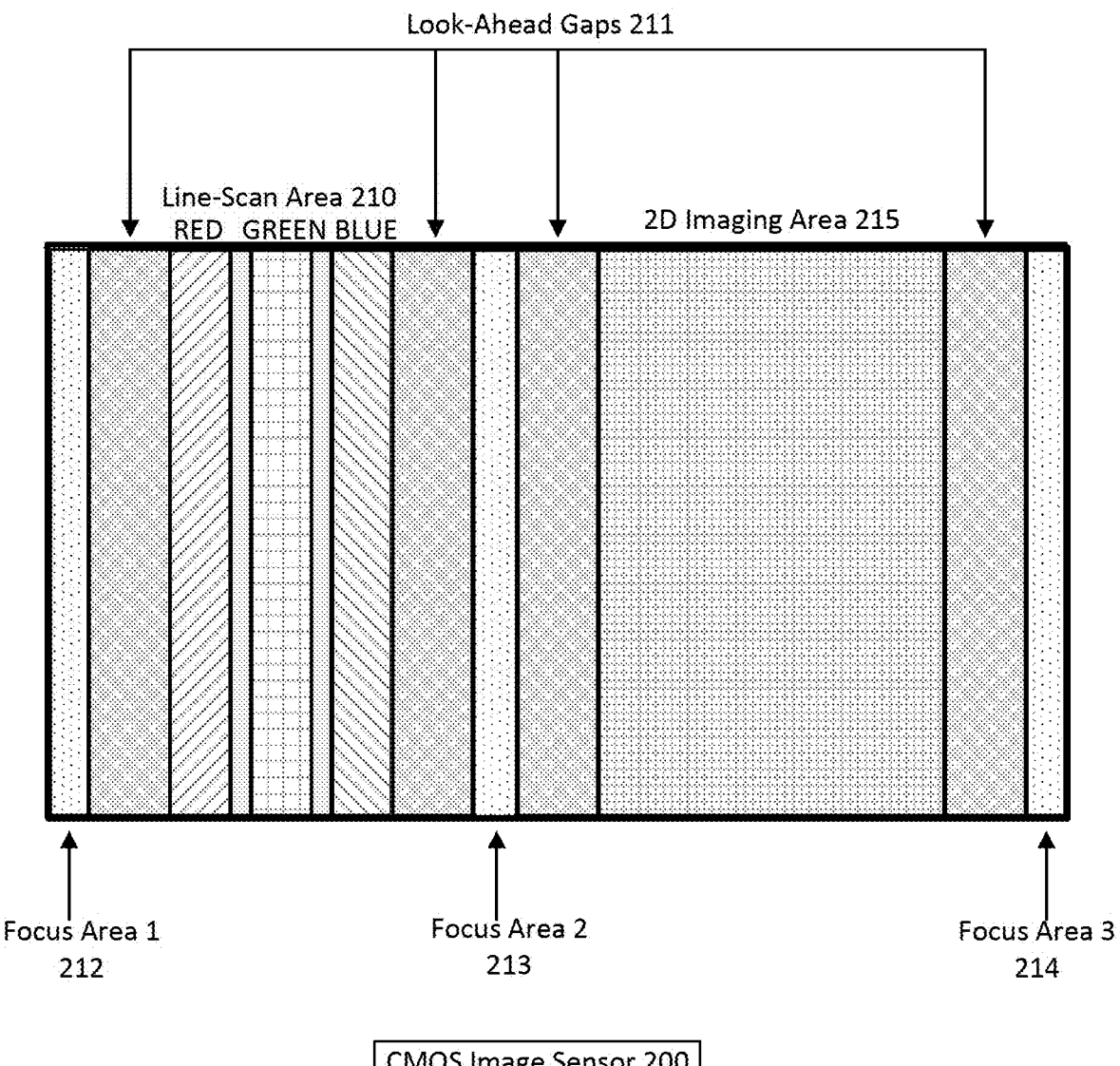
FIG. 2 shows an example of a configuration of a complementary metal oxide semiconductor (CMOS) image sensor according to some embodiments of the present invention.

FIG. 2 shows an example of a configuration of a CMOS image sensor according to some embodiments of the present invention. As shown in FIG. 2, portions of the CMOS image sensor 200 may be configured for line-scanning (e.g., line-scan area 210), 2D imaging (e.g., 2D imaging area 215), and focusing (e.g., focus area 1 212, focus area 2 213, and focus area 3 214). In some examples, the portion of the CMOS image sensor 200 configured as the line-scan area 210 may include one or more columns of pixels configured with red color filtering elements (red pixels), one or more columns of pixels configured with green color filtering elements (green pixels), and one or more columns of pixels configured with blue color filtering elements (blue pixels). Additionally, the CMOS image sensor 200 may be configured with one or more columns of pixels with no color filtering elements (gray pixels) included between the one or more columns of red pixels and the one or more columns of green pixels and another one or more columns of gray pixels included between the one or more columns of green pixels and the one or more column of blue pixels.

As further shown in FIG. 2, the portion of the CMOS image sensor 200 configured as the 2D imaging area 215 may include a plurality of columns of pixels arranged in a matrix. In some examples, the pixels of 2D imaging area 215 may be configured with red color filtering elements (red pixels), green color filtering elements (green pixels), and blue color filtering elements (blue pixels). The red color filtering elements, green color filtering elements, and the blue color filtering elements may be arranged in a Bayer pattern or other color filtering pattern. In some examples, the pixels of the 2D imaging area 215 may not be overlaid with any color filtering elements.

In some examples, each of the red coloring filtering elements, green color filtering elements, and blue color filtering elements may be formed of one or more materials dyed with at least organic dye. In some examples, each of the red coloring filtering elements, green color filtering elements, and blue color filtering elements may be formed of at least one dielectric stack. In some configurations, the red pixels receive light, filtered by the red color filtering elements, in a wavelength band ranging from about 620 nm to about 750 nm, the green pixels receive light, filtered by the green color filtering elements, in a wavelength band ranging from about 495 nm to about 570 nm, and the blue pixels receive light, filtered by the blue color filtering elements, in a wavelength band ranging from about 450 nm to about 495 nm. In some examples, the red pixels receive light filtered by the red color filtering elements into one or more sub-bands within a wavelength band ranging from about 620 nm to about 750 nm, the green pixels receive light filtered by the green color filtering elements into one or more sub-bands within a wavelength band ranging from about 495 nm to about 570 nm, and the blue pixels receive light filtered by the blue color filtering elements into one or more sub-bands within a wavelength band ranging in a wavelength band ranging from about 450 nm to about 495 nm.

The foregoing color filtering elements and arrangements are merely illustrative. Other color filtering elements and arrangements are encompassed by the invention. For example, the line-scan area 210 may scan images based on a complementary color scheme, where one or more columns of pixels have cyan color filtering elements associated therewith, one or more columns of pixels have magenta color filtering elements associated therewith, one or more columns of pixels have yellow color filtering elements associated therewith, and one or more columns of pixels have green color filtering elements associated therewith. In another example, the 2D imaging area 215 may capture images based on the complementary color scheme and include pixels overlaid with cyan color filtering elements, magenta color filtering elements, yellow color filtering elements, and green color filtering elements. In some examples, each of the pixels of the line-scan area 210 and each of the pixels of the 2D imaging area 215 may receive light filtered by one or more color filtering elements in one or more wavelength bands. In some examples, each of the pixels of the line-scan area 210 and each of the pixels of the 2D imaging area 215 may be formed of vertically stacked photodiodes with respective spectral sensitivities. In some examples, CMOS image sensor 200 may be configured with tunable color filters and plasmonic-based color filters.

In some examples, the line-scan area 210 may scan brightfield images of the one or more slides. In some examples, the 2D imaging area 215 may capture 2D brightfield images of the one or more slides. In some examples, the 2D imaging area 215 may capture 2D florescence images of the one or more slides. In some examples, the line-scan area 210 may scan one or more brightfield images of the one or more slides and the 2D imaging area 215 may captures one or more 2D brightfield images of the one or more slides. In some examples, the line-scan area 210 may scan one or more brightfield images of the one or more slides and the 2D imaging area 215 may capture one or more 2D fluorescence images of the one or more slides.

As shown in FIG. 2, the portions of the CMOS image sensor 200 configured as focus area 1 212 may include one or more columns of pixels, focus area 2 213 may include one or more columns of pixels, and focus area 3 214 may include one or more columns of pixels. In some examples, focus area 1 212 and focus area 2 213 may be respectively arranged on either side of the line-scan area 210. In some examples, focus area 2 213 and focus area 3 214 may be respectively arranged on either side of the 2D imaging area 215. In some examples, signals output from focus area 1 212, focus area 213, and focus area 3 214 may be used to estimate a focal plane for the line-scan area 210 and the 2D imaging area 215. As shown in FIG. 2, portions of CMOS image sensor 200 may be configured as look-ahead gaps 211. In some examples, the portions of the CMOS image sensor 200 configured as look-ahead gaps 211 may include one or more columns of pixels. In some examples, signals output from focus area 1 212, focus area 2 213, focus area 3 214, and look-ahead gaps 211 enable CMOS image sensor 200 to perform bi-directional forward-looking dynamic focusing on the one or more slides.

In some examples, signals output from focus area 1 212, focus area 2 213, and focus area 3 214 may be used to estimate the focal plane using contrast-based auto-focusing techniques or phase-difference-based auto-focusing techniques. In some examples, signals output from focus area 1 212, focus area 2 213, and focus area 3 214 may be used to estimate the focal plane for the line-scan area 210 and the 2D imaging area 215 based on a combination of contrast-based auto-focusing techniques and phase-difference-based auto-focusing techniques. In some examples, signals output from focus area 1 212, focus area 2 213, and focus area 3 214 may be used to estimate the focal plane for the line-scan area 210 and the 2D imaging area 215 based on passive focusing techniques, active ranging techniques, and/or a combination of focusing techniques.

Figure 3:
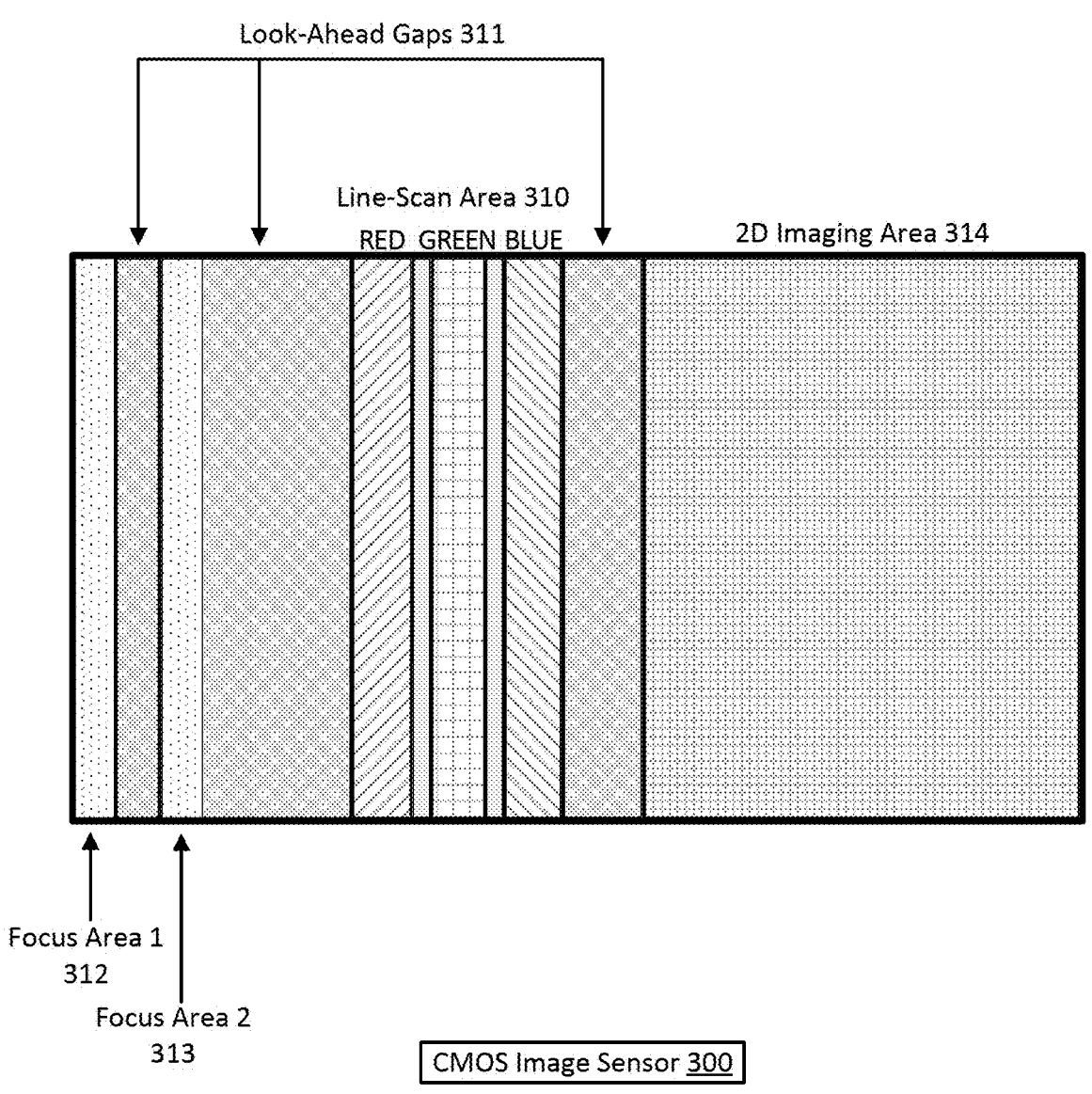
FIG. 3 shows another example of a configuration of a CMOS image sensor according to some embodiments of the present invention.

The foregoing arrangements of focus areas and look-ahead gaps are merely illustrative and other arrangements are encompassed by the present invention. For example, FIG. 3 shows another example of a configuration of a CMOS image sensor according to some embodiments of the present invention. As shown in FIG. 3, portions of CMOS image sensor 300 may be configured as a line-scan area 310, a 2D imaging area 314, focus area 1 312, focus area 2 313, and look-ahead gaps 311. In this example, focus area 1 312 and focus area 2 313 may be arranged on one side of the line-scan area 310 and look-ahead gaps 311 may be arranged between focus area 1 312 and focus area 2 313 and on either side of the line-scan area 310. Other features and operations of CMOS image sensor 300 are similar to the features and operations of CMOS image sensor 200, which have described above and are not repeated herein.

In some examples, signals output from focus area 1 212, focus area 2 213, and focus area 3 214 of CMOS image sensor 200 may be used to estimate a focal plane for the line-scan area 210 and the 2D imaging area 215 and signals output from focus area 1 312 and focus area 2 313 of CMOS image sensor 300 may be used to estimate a focal plane for the line-scan area 310 and 2D imaging area 314. In order estimate a focal plane, the CMOS image sensor 200 or 300 may be coupled with a castellated optical element.

Figure 4:
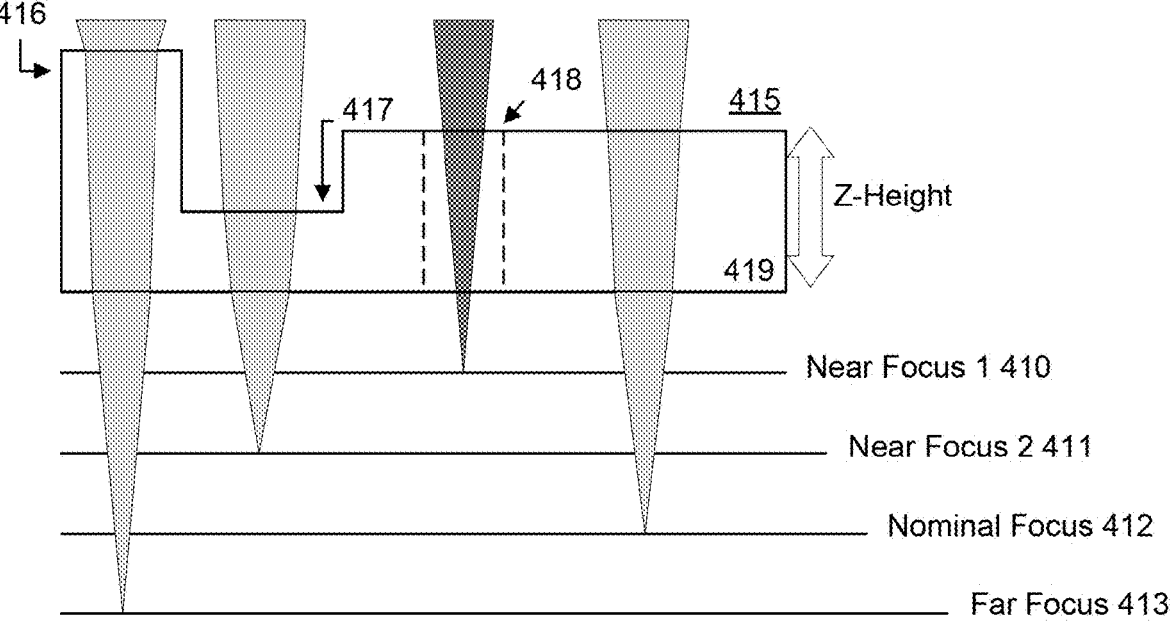
FIG. 4 shows an example configuration of a castellated optical element according to some embodiments of the present invention.

FIG. 4 shows an example configuration of a castellated optical element 415 that may be coupled with a CMOS image sensor 200, 300 according to some embodiments of the present invention. As shown in FIG. 4, castellated optical element 415 may be configured with portions having different refractive indices. For example, castellated optical element 415 may be configured with a first portion 416, having a first refractive index, that causes light to converge on a far focus plane 413, a second portion 417, having a second refractive index, that causes light to converge on near focus plane 2 411, and a third portion 418, having a third refractive index, that causes light to converge to near focus plane 1 410. In some examples, the far focus plane 413 may be located a first distance from an object plane (not shown), the near focus plane 2 411 may be located a second distance, less than the first distance, from the object plane (not shown), and the near focus plane 1 410 may be located a third distance, less than the first and second distances, from the object plane (not shown). In some examples, the third portion 418 may include one or more air through-holes formed by removing material from the castellated optical element 415. In some examples, the third portion 418 may be configured with one or more materials having a refractive index less than the first and second refractive index. Castellated optical element 415 may be further configured with an image capturing portion 419, having an image capturing refractive index, that causes light to converge on a nominal focus plane 412. In some examples, the first portion 416 may be thicker than the second, third, and image capturing portions 417, 418, and 419, respectively. In some examples, the third and image capturing portions 418 and 419, respectively, may be thicker than the second portion 417. In some examples, castellated optical element 415 may be comprised of high-density flint glass. In some examples, the castellated optical element 415 may be comprised of acrylic plastic. In some examples, castellated optical element 415 may be comprised of a combination of high-density flint glass and acrylic plastic. In some examples, the first, second, third, and image capturing portions 416, 417, 418, and 419, respectively, may be comprised of different materials having different refractive indices. In some examples, the image capturing portion 419 may be at least 3.6 mm thick, the first portion 416 may be at least 7 mm thick, and the second and third portions 417 and 418, respectively, may range in thickness between 3.6 mm and 7 mm.

With respect to CMOS image sensor 200, in some examples, focus area 1 212 may receive light converged on the far focus plane 413, focus area 2 213 may receive light converged on the near focus plane 2 411, focus area 3 214 may receive light converged on the near focus plane 1 410, and line-scan area 210 and 2D imaging area 215 may each receive light converged on the nominal focus plane 412.

As previously discussed, in some examples, signals output from focus area 1 212, focus area 2 213, and focus area 3 214 may be used to estimate a focal plane for the line-scan area 210 and the 2D imaging area 215. In some examples, castellated optical element 415 may be positioned in an initial position. In some examples, when the castellated optical element 415 is positioned in the initial position, the nominal focus plane 412 may be located between the far focus plane 413 and the near focus plane 2 411 and the near focus plane 2 411 may be located between the near focus plane 1 410 and the nominal focus plane 412. In some examples, the castellated optical element 415 may shift from its initial position in a direction perpendicular to the object plane (z-height) based on the estimated focal plane. In some examples, the castellated optical element 415 may shift about 1 μm from its initial position towards the object plane or about 1 μm from its initial position towards the imaging plane (not shown).

The foregoing focus arrangement pertaining to CMOS image sensor 200 of FIG. 2 may be similarly applied to the CMOS image sensor 300 of FIG. 3. For example, in some arrangements, focus area 1 312 and focus area 2 313 of CMOS image sensor 300 may be arranged to receive light converged on any of the far focus, near focus 2, and near focus 1 planes 413, 411, and 410, respectively. The foregoing arrangements are merely exemplary and other arrangements utilizing one or more focus areas and focusing planes are encompassed by the present invention.

In some examples, digital pathology involves the acquisition, management, and interpretation of data relating to pathology. Some aspects of digital pathology may involve capturing images of one or more slides comprising one or more biological materials using the CMOS image sensor and castellated optical element according to the configurations shown in FIG. 2, FIG. 3, and/or FIG. 4, performing computer-based analysis of the captured images, and outputting the results of the analysis for interpretation, diagnosis, and therapeutic decision-making. In some examples, biological materials may include materials of human origin, materials of animal origin, and/or microbes. In some examples, biological materials may also include muscle tissue, organ tissue, blood, blood derivatives, urine, stool, saliva, cells, cultures, and/or other materials. In some examples, biological materials may be obtained from living and dead organisms. In some examples, biological materials may be obtained from biobanks, biorepositories, and/or other entities that acquire and store biological materials.

In some examples, one or more biological materials may be fixed/embedded to one or more slides. For example, in the case of a piece of tissue (e.g., a sample of one or more portions of a tumor), the piece of tissue may be sliced to obtain a plurality of tissue samples, with each sample having certain dimensions and fixed/embedded onto one or more glass slides using a fixating/embedding agent. In some examples, slicing each piece of tissue may involve chilling the piece of tissue and slicing the chilled piece of tissue in a warm water bath. Because the fixation/embedding process renders cells in each sample virtually transparent, each of the samples may be stained with an agent to make cellular structures more visible. In some examples, different samples may be stained with one or more different stains to express different characteristics for the respective sample. In some examples, different samples may be exposed to different predefined volumes of a staining agent for a predefined time. In some examples, staining may involve histochemical staining. In some examples, staining agents may include hematoxylin, trichrome, Periodic-Acid-Schiff, giemsa, reticulin, and/or toluidine blue. Additionally, in some examples, staining may involve direct or indirect immunohistochemistry staining. The foregoing examples are non-limiting and other methods for fixing/embedding biological materials are encompassed by the present invention.

In some examples, images of the one or more slides comprising one or more biological materials may be captured based on whole slide imaging techniques, tile-based scanning techniques, and/or line-based scanning techniques. In some examples, images may be captured based on brightfield detection, fluorescence detection, and/or multispectral detection techniques. In some examples, the captured images of the one or more slides may be analyzed by an image analysis algorithm configured for digital pathology. In some examples, the image analysis algorithm may detect, characterize and/or quantify biological elements of interest (e.g., tumor cells, each tumor, immune cells, etc.) within the captured images. In some examples, the image analysis algorithm may localize and outline tumors within the captured images. In some examples, the image analysis algorithm may determine an amount, a quantity and/or a size associated with the one or more biological materials (e.g., cell count). In some examples, the image analysis algorithm may generate one or more detections, segmentations, bounding boxes, labels, identifications, classifications, annotations, highlights, frames, and/or outlines for one or more objects of interest within the captured images. In some examples, the image analysis algorithm may be configured using machine learning and deep learning techniques. In some examples, the image analysis algorithm may include and/or use one or more neural networks. In some examples, outputs of the image analysis algorithm may be provided to a human pathologist for further analysis and/or interpretation. In some examples, using a viewing device, the human pathologist may annotate the captured images to train the image analysis algorithm to detect, analyze, and classify biological objects of interest within the captured images. In some examples, the annotated images and outputs of the image analysis algorithm may assist a physician in diagnosing a subject and/or guide therapeutic decision-making.

Figure 5:
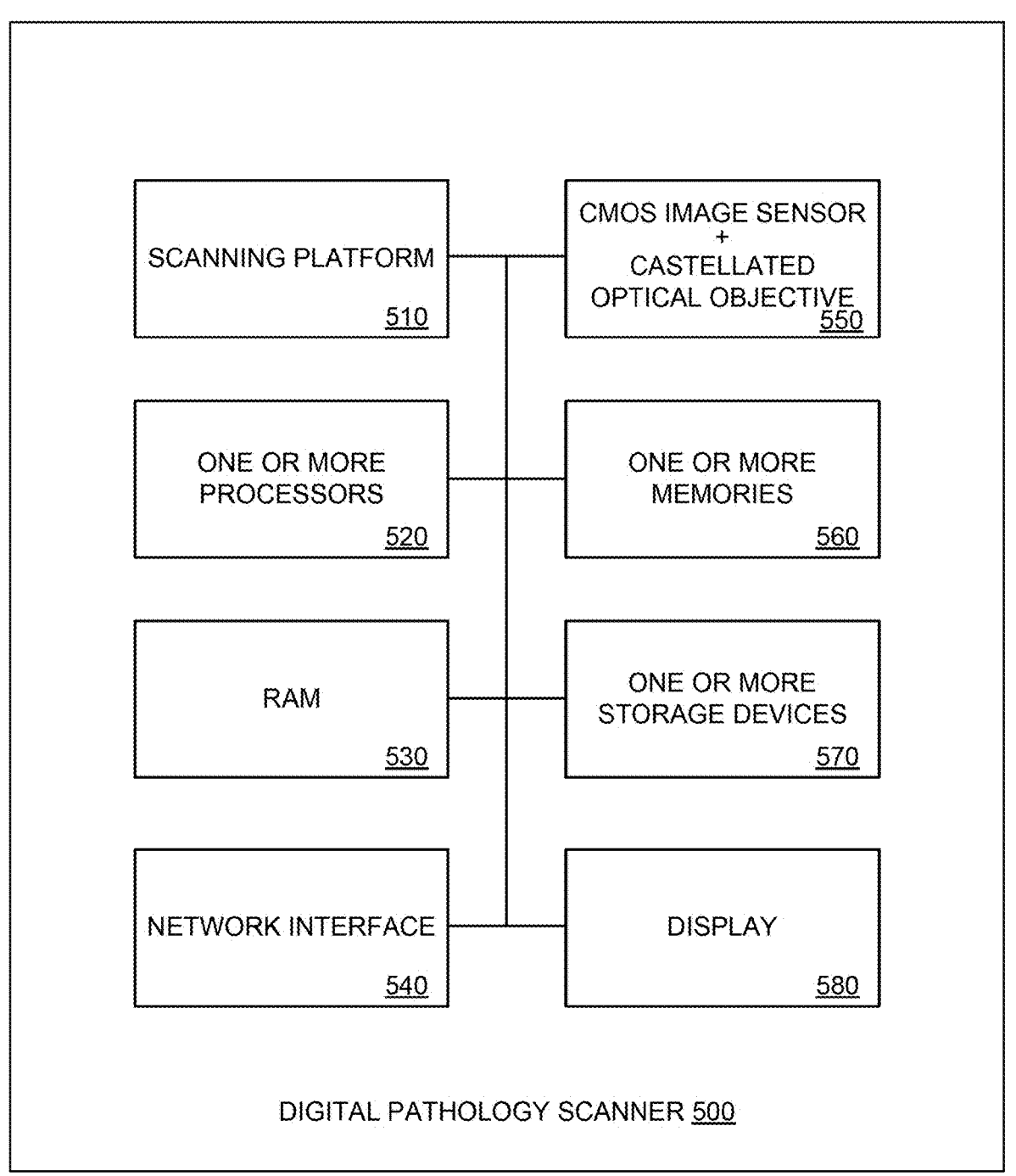
FIG. 5 shows an exemplary digital pathology scanner according to some embodiments of the present invention.

FIG. 5 shows an exemplary digital pathology scanner 500 according to some embodiments of the present invention. As shown in FIG. 5, digital pathology scanner 500 may include a scanning platform 510, one or more processors 520, RAM 530, network interface 540, CMOS image sensor and castellated optical element 550, one or more memories 560, one or more storage devices 570, and display 580. Scanning platform 510 may be configured to pass one or more slides comprising one or more biological materials in front of the CMOS image sensor and castellated optical element 550 for imaging. In some examples, imaging may be based on whole slide imaging techniques, tile-based scanning techniques, and/or line-based scanning techniques. In some examples, capturing the images may involve brightfield detection, fluorescence detection, and multispectral detection techniques. In some examples, the one or more slides may be prepared as described above. In some examples, CMOS image sensor and castellated optical element 550 may be configured according to the configurations shown in FIG. 2, FIG. 3, and/or FIG. 4. Other arrangements are encompassed within the scope of the invention.

One or more memories 560 are configured to store one or more programs for imaging and analyzing the captured images. One or more processors 520 are configured to read the one or more programs from the one or more memories 560 and execute them using RAM 530. In some examples, one or more of the programs may comprise a program for executing an image analysis algorithm. In some examples, the image analysis algorithm may detect, characterize and/or quantify biological elements of interest (e.g., tumor cells, each tumor, immune cells, etc.) within the captured images. In some examples, the image analysis algorithm may localize and outline tumors within the captured images. In some examples, the image analysis algorithm may determine an amount, a quantity and/or a size associated with the one or more biological materials (e.g., cell count). In some examples, the image analysis algorithm may generate one or more detections, segmentations, bounding boxes, labels, identifications, classifications, annotations, highlights, frames, and/or outlines for one or more objects of interest within the captured images. In some examples, the image analysis algorithm may be configured using machine learning and deep learning techniques. In some examples, the image analysis algorithm may include and/or use one or more neural networks.

One or more storage devices 570 may be configured to store the captured images and/or outputs of the image analysis algorithm. In some examples, outputs of the image analysis algorithm may be provided to a human pathologist for further analysis and/or interpretation. In some examples, network interface 540 may output, to a network, a server, or other device, the captured images and/or the outputs of the image analysis algorithm. In some examples, display 580 may display the captured images and/or the outputs of the image analysis algorithm. In some examples, using the display 580, the human pathologist may annotate the captured images to train the image analysis algorithm to detect and classify biological objects of interest within the captured images. In some examples, the annotated images may assist a physician in diagnosing a subject and/or guide therapeutic decision-making.

Figure 6:
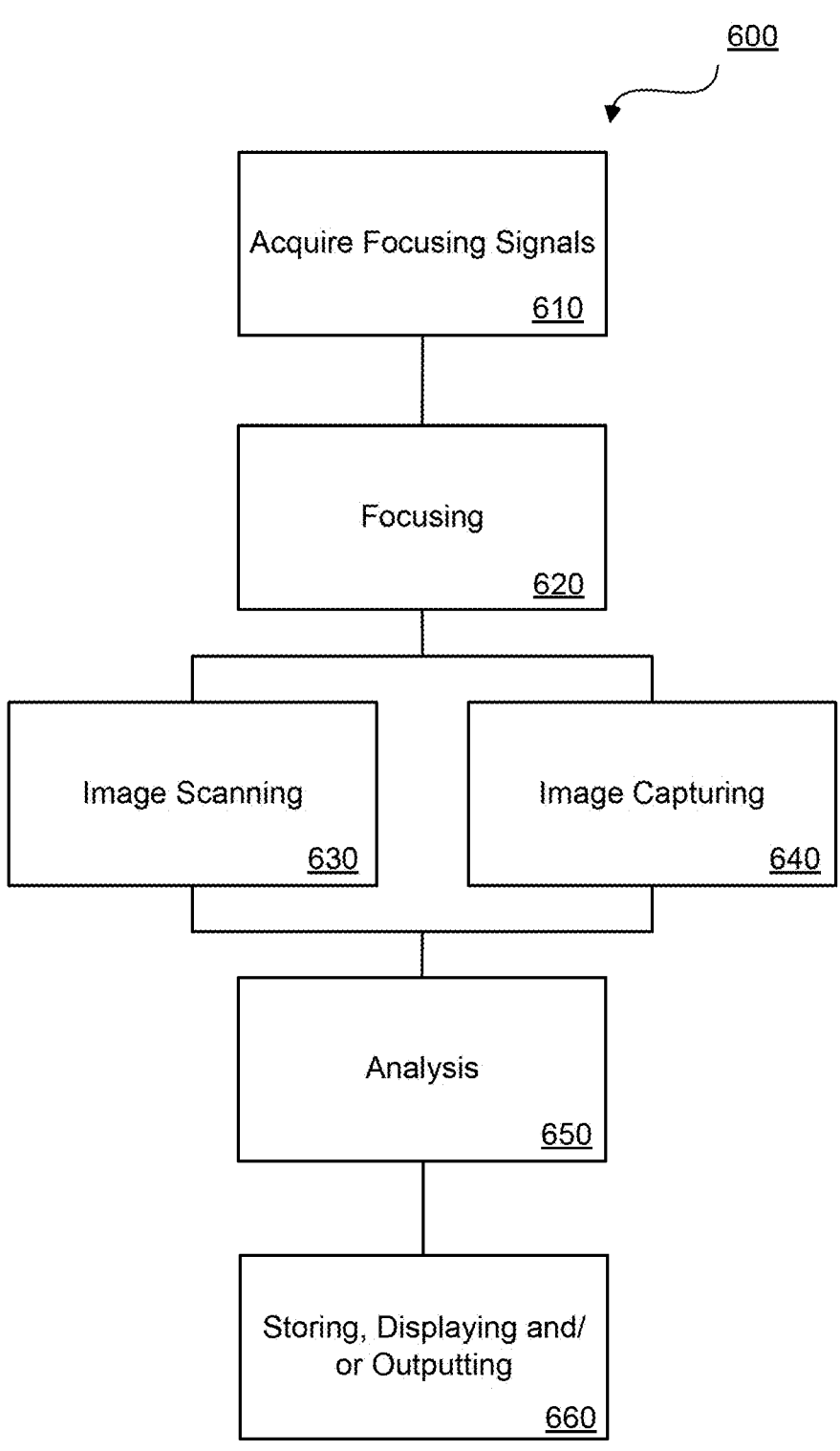
FIG. 6 shows a flowchart of an exemplary process for imaging according to some embodiments of the present invention.

FIG. 6 shows a flowchart of an exemplary process 600 for imaging according to some embodiments of the present invention. In some examples, the process may be implemented with a digital pathology scanning system based on the digital pathology scanner 500 according to FIG. 5. In some examples, the process may be implemented in software or hardware or any combination thereof. In some examples, a processor or computer system may be configured to perform the process. For example, at block 610, the system acquires signals from one or more focus areas of a CMOS image sensor such as CMOS image sensor 200 of FIG. 2 or CMOS image sensor 300 of FIG. 3. At block 620, the system performs focusing on the one or more slides based on the acquired signals. In some examples, focusing may include bi-directional forward-looking dynamic focusing. In some examples, signals output from the one or more focus areas may be used to estimate a focal plane for a 2D imaging area of the CMOS image sensor. In some examples, focusing may be performed based on contrast-based auto-focusing techniques, phase-difference-based auto-focusing techniques, or a combination of contrast-based auto-focusing techniques and phase-difference-based auto-focusing techniques. In some examples, focusing may be performed based on passive focusing techniques, active ranging techniques, and/or a combination of focusing techniques.

In some examples, a castellated optical element, such as castellated optical element 415 of FIG. 4, may be positioned in an initial position. In some examples, when the castellated optical element is positioned in the initial position, a nominal focus plane may be located between a far focus plane and a near focus plane 2 and the near focus plane 2 may be located between a near focus plane 1 and the nominal focus plane. In some examples, the castellated optical element may shift from its initial position in a direction perpendicular to the object plane (z-height) based on the estimated focal plane. In some examples, the castellated optical element may shift about 1 μm from its initial position towards the object plane or about 1 μm from its initial position towards the imaging plane (not shown).

At blocks 630 and 640, the system scans the one or more slides with the line-scan area and captures one or more images of the one or more slides with the 2D imaging area. In some examples, the scanning and capturing may be based on whole slide imaging techniques, tile-based scanning techniques, and line-based scanning techniques. In some examples, the scanning and capturing may be based on brightfield detection, fluorescence detection, and/or multi-spectral detection techniques. In some examples, the line-scan area may scan one or more brightfield images and/or one or more fluorescence images of the one or more slides. In some examples, the 2D imaging area may capture one or more 2D brightfield images and/or one or more 2D fluorescence images of the one or more slides.

At block 650, the system analyzes, using an image analysis algorithm configured for digital pathology that is stored in a memory and executed by a processor of the system, the one or more captured images of the one or more slides. In some examples, the image analysis algorithm may detect, characterize and/or quantify biological elements of interest (e.g., tumor cells, each tumor, immune cells, etc.) within the captured images. In some examples, the image analysis algorithm may localize and outline tumors within the captured images. In some examples, the image analysis algorithm may determine an amount, a quantity and/or a size associated with the one or more biological materials (e.g., cell count). In some examples, the image analysis algorithm may generate one or more detections, segmentations, bounding boxes, labels, identifications, classifications, annotations, highlights, frames, and/or outlines for one or more objects of interest within the captured images. In some examples, the image analysis algorithm may be configured using machine learning and deep learning techniques. In some examples, the image analysis algorithm may include and/or use one or more neural networks (e.g., a convolutional neural network). At block 660, the system stores, displays and/or outputs the captured images and/or the outputs of the image analysis algorithm. In some examples, outputs of the image analysis algorithm may be provided to a human pathologist, via network interface 540 and/or display 580, for further analysis and/or interpretation. In some examples, using a viewing device, the human pathologist may annotate the captured images to train the image analysis algorithm to detect, analyze, and classify biological objects of interest within the captured images. In some examples, the annotated images and outputs of the image analysis algorithm may assist a physician in diagnosing a subject and/or guide therapeutic decision-making.

The systems and methods of the present disclosure may be implemented using hardware, software, firmware, or a combination thereof and may be implemented in one or more computer systems or other processing systems. Some embodiments of the present disclosure include a system including one or more processors. In some embodiments, the system includes a non-transitory computer readable storage medium containing instructions which, when executed on the one or more processors, cause the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. An imaging system, comprising:
a castellated optical element; and
a complementary metal oxide semiconductor (CMOS) image sensor, wherein the CMOS image sensor comprises:
a plurality of pixels arranged in a plurality of pixel columns, wherein a first set of columns of the plurality of pixel columns includes a plurality of focus areas, a second set of columns of the plurality of pixel columns includes a line-scan area, and a third set of columns of the plurality of pixel columns includes a two-dimensional imaging area; and
a plurality of color filtering members disposed over at least one of pixels of the line-scan area or pixels of the two-dimensional imaging area, wherein the plurality of color filtering members comprise one or more first color filtering elements, one or more second color filtering elements, and one or more third color filtering elements.

2. The imaging system according to claim 1, wherein the castellated optical element is formed of a plurality of portions, each portion of the plurality of portions having a different refractive index.

3. The imaging system according to claim 1, wherein the castellated optical element is formed of a plurality of portions, wherein a first portion of the plurality of portions is disposed over a first portion of the first set of columns of the plurality of pixel columns and causes light to converge on a first focal plane separated a first distance from an object plane and a second portion of the plurality of portions of the castellated optical element is disposed over a second portion of the first set of columns of the plurality of pixel columns and causes light to converge on a second focal plane separated a second distance from the object plane, the second distance being less than the first distance.

4. The imaging system according to claim 1, wherein a first focus area of the plurality of focus areas receives light converged on a first focal plane separated a first distance from an object plane and a second focus area of the plurality of focus areas receives light converged on a second focal plane separated a second distance from the object plane, the second distance being less than the first distance.

5. The imaging system according to claim 1, wherein the castellated optical element is formed of a plurality of portions, wherein a first portion of the plurality of portions is disposed over a first portion of the first set of columns of the plurality of pixel columns, a second portion of the plurality of portions of the castellated optical element is disposed over a second portion of the first set of columns of the plurality of pixel columns, and a third portion of the plurality of portions of the castellated optical element is disposed over a third portion of the first set of columns of the plurality of pixel columns.

6. The imaging system according to claim 1, wherein a first focus area of the plurality of focus areas receives light converged on a first focal plane, a second focus area of the plurality of focus areas receives light converged on a second focal plane, and a third focus area of the plurality of focus areas receives light converged on a third focal plane.

7. The imaging system according to claim 1, wherein each of the one or more first color filtering elements, one or more second color filtering elements, and one or more third color filtering elements comprises one or more materials dyed with at least organic dye.

8. The imaging system according to claim 1, wherein the plurality of color filtering members are disposed over pixels of the line-scan area.

9. The imaging system according to claim 1, wherein the plurality of color filtering members are disposed over pixels of the two-dimensional imaging area.

10. The imaging system according to claim 1, wherein each of the one or more first color filtering elements, one or more second color filtering elements, and one or more third color filtering elements comprises at least one dielectric stack.

11. The imaging system according to claim 1, wherein the one or more first color filtering elements filter light into a first red wavelength band and second red wavelength band, wherein the one or more second color filtering elements filter light into a first green wavelength band and second green wavelength band, and wherein the one or more third color filtering elements filter light into a first blue wavelength band and second blue wavelength band.

12. The imaging system according to claim 1, wherein the line-scan area is disposed between a first focus area of the plurality of focus areas and a second focus area of the plurality of focus areas and the two-dimensional imaging area is disposed between the second focus area of the plurality of focus areas and a third focus area of the plurality of focus areas.

13. The imaging system according to claim 1, wherein the line-scan area is disposed between the plurality of focus areas and the two-dimensional imaging area.

14. The imaging system according to claim 1, wherein the CMOS image sensor is configured to capture brightfield images.

15. The imaging system according to claim 1, wherein the CMOS image sensor is configured to capture fluorescence images.

16. The imaging system according to claim 1, wherein the castellated optical element comprises high-density flint glass.

17. The imaging system according to claim 1, wherein the CMOS image sensor is configured to perform bi-directional forward-looking dynamic focusing on one or more slides comprising at least biological material based on signals acquired from the plurality of focus areas.

18. A method for imaging, the method comprising:
acquiring a plurality of focusing signals of one or more slides comprising at least one biological material with a plurality of focus areas of a CMOS image sensor, wherein a first focus area of the plurality of focus areas receives light, passed through a castellated optical element, from a first focal plane, a second focus area of the plurality of focus areas receives light, passed through the castellated optical element, from a second focal plane, and a third focus area of the plurality of focus areas receives light, passed through the castellated optical element, from a third focal plane;

scanning the one or more slides with a line-scanning area of the CMOS image sensor; and capturing an image of the one or more slides with a two-dimensional imaging area of the CMOS image sensor.

19. The method for imaging according to claim 18, wherein the castellated optical element is formed of a plurality of portions, each portion of the plurality of portions having a different refractive index.

20. The method for imaging according to claim 18, wherein the first focal plane is located at a first distance from an object plane, the second focal plane is located at a second distance from the object plane, and the third focal plane is located at a third distance from the object plane, wherein the first distance is greater than the second distance and the second distance is greater than the third distance.

21. The method for imaging according to claim 18, wherein a plurality of color filtering members disposed over at least one of pixels of the line-scan area or pixels of the two-dimensional imaging area comprising one or more first color filtering elements, one or more second color filtering elements, and one or more third color filtering elements.

22. The method for imaging according to claim 18, wherein a plurality of color filtering members disposed over at least one of pixels of the line-scan area or pixels of the two-dimensional imaging area comprise one or more materials dyed with at least organic dye.

23. The method for imaging according to claim 18, wherein a plurality of color filtering members disposed over at least one of pixels of the line-scan area or pixels of the two-dimensional imaging area comprise at least one dielectric stack.

24. The method for imaging according to claim 18, wherein one or more first color filtering elements filter light into a first red wavelength band and second red wavelength band, one or more second color filtering elements filter light into a first green wavelength band and second green wavelength band, and one or more third color filtering elements filter light into a first blue wavelength band and second blue wavelength band.

25. The method for imaging according to claim 18, wherein the line-scan area is disposed between a first focus area of the plurality of focus areas and a second focus area of the plurality of focus areas and the two-dimensional imaging area is disposed between the second focus area of the plurality of focus areas and a third focus area of the plurality of focus areas.

26. The method for imaging according to claim 18, wherein the line-scan area is disposed between the plurality of focus areas and the two-dimensional imaging area.

27. The method for imaging according to claim 18, wherein capturing the image comprises capturing brightfield images.

28. The method for imaging according to claim 18, wherein capturing the image comprises capturing fluorescence images.

29. The method for imaging according to claim 18, further comprising:

performing bi-directional forward-looking dynamic focusing on the one or more slides based on the plurality of focusing signals and the one or more slides.

\* \* \* \* \*